United States Patent
Kashitani et al.

(10) Patent No.: US 12,486,137 B2
(45) Date of Patent: Dec. 2, 2025

(54) TAPE ADHERING APPARATUS

(71) Applicant: OHASHI ENGINEERING CO., LTD., Tokyo (JP)

(72) Inventors: Hisayoshi Kashitani, Tokyo (JP); Akira Tomita, Tokyo (JP); Tsuyoshi Kondo, Tokyo (JP)

(73) Assignee: OHASHI ENGINEERING CO., LTD., Tokyo (JP)

( * ) Notice: Subject to any disclaimer, the term of this patent is extended or adjusted under 35 U.S.C. 154(b) by 0 days.

(21) Appl. No.: 18/684,315

(22) PCT Filed: May 8, 2023

(86) PCT No.: PCT/JP2023/017252
§ 371 (c)(1),
(2) Date: Feb. 16, 2024

(87) PCT Pub. No.: WO2024/176475
PCT Pub. Date: Aug. 29, 2024

(65) Prior Publication Data
US 2025/0145402 A1    May 8, 2025

(30) Foreign Application Priority Data
Feb. 20, 2023   (JP) ................. 2023-024127

(51) Int. Cl.
*B65H 37/04*  (2006.01)
*B65H 35/00*  (2006.01)

(52) U.S. Cl.
CPC ..... *B65H 35/0086* (2013.01); *B65H 35/0033* (2013.01); *B65H 37/04* (2013.01);
(Continued)

(58) Field of Classification Search
None
See application file for complete search history.

(56) References Cited

U.S. PATENT DOCUMENTS 3,765,992 A * 10/1973 Stageberg ............ B65H 37/002
156/767
5,112,427 A *  5/1992 Bekker-Madsen .... B65C 9/1803
83/214
(Continued)

FOREIGN PATENT DOCUMENTS

JP    H08-11094 A     1/1996
JP    2005-075598 A   3/2005
(Continued)

OTHER PUBLICATIONS

English machine translation of JP7141144 B1 published Sep. 22, 2022; Kashitani et al.; 10 pages. (Year: 2022).*
(Continued)

*Primary Examiner* — Linda L Gray
(74) *Attorney, Agent, or Firm* — Oliff PLC

(57) ABSTRACT

A tape adhering apparatus is provided for attaching an anisotropic conductive tape to a workpiece with uniform length. In the tape adhering apparatus (1), a a conveying unit (30) intermittently performs an operation of conveying a tape member (T) by a length obtained by adding a gap length (L2) to a predetermined length (L1), and a cutting unit (10) includes a blade holding unit (12) that holds a downstream cutting blade (13) and an upstream cutting blade (14) in a state where the length from the downstream cutting blade (13) to the upstream cutting blade (14) is the predetermined length (L1), and advances toward an anisotropic conductive tape (t1) to cut the anisotropic conductive tape (t1) into the predetermined length (L1) when the conveying unit (30) stops the operation of conveying the tape member (T).

4 Claims, 5 Drawing Sheets

(52) U.S. Cl.
CPC ............ *B65H 2301/515326* (2013.01); *B65H 2701/37* (2013.01)

(56) References Cited

U.S. PATENT DOCUMENTS

| | | | | |
|---|---|---|---|---|
| 6,024,148 | A * | 2/2000 | Saitoh | B65H 37/002 156/519 |
| 2003/0127192 | A1 * | 7/2003 | Beaudry | B31D 1/021 156/352 |
| 2014/0332140 | A1 * | 11/2014 | Chen | B32B 38/0004 156/247 |

FOREIGN PATENT DOCUMENTS

| | | | | |
|---|---|---|---|---|
| JP | 4825654 | B2 | 11/2011 | |
| JP | 2012-209395 | A | 10/2012 | |
| JP | 2014-121751 | A | 7/2014 | |
| JP | 7141144 | B1 * | 9/2022 | ............ B23P 21/00 |
| WO | 2019/059057 | A1 | 3/2019 | |

OTHER PUBLICATIONS

English machine translation of WO-2011158476-A1 published Dec. 22, 2011; Yamada; 34 pages; Y10T156/1064. (Year: 2011).*
English machine translation of WO 2008038557 A1 published Apr. 3, 2008; Odawara et al.; 46 pages; Y10T156/1064. (Year: 2008).*
English machine translation of WO 2012086132 A1 published Jun. 28, 2012; Odawara et al.; 34 pages; Y10T156/1062. (Year: 2012).*
English machine translation of JP2014121751 A published Jul. 3, 2014; Aoyama et al.; 26 pages. (Year: 2014).*
English machine translation of JP 5078672 B2 published Nov. 21, 2012; 28 pages; B32B37/1284. (Year: 2012).*
English machine translation of JP 2012209395 A published Oct. 25, 2012; Ichihashi; 20 pages. (Year: 2012).*
English machine translation of KR 20170006284 A published Jan. 17, 2017; Hirose; 26 pages; B65H35/06. (Year: 2017).*
May 3, 2025 Office Action issued in Chinese Patent Application No. 202380013206.5.
Jun. 20, 2023 Search Report issued in International Patent Application No. PCT/JP2023/017252.
Jun. 20, 2023 Written Opinion of the International Searching Authority issued in International Patent Application No. PCT/JP2023/017252.
Jun. 14, 2025 Office Action issued in Chinese Patent Application No. 202380013206.5.

* cited by examiner

[FIG. 1]
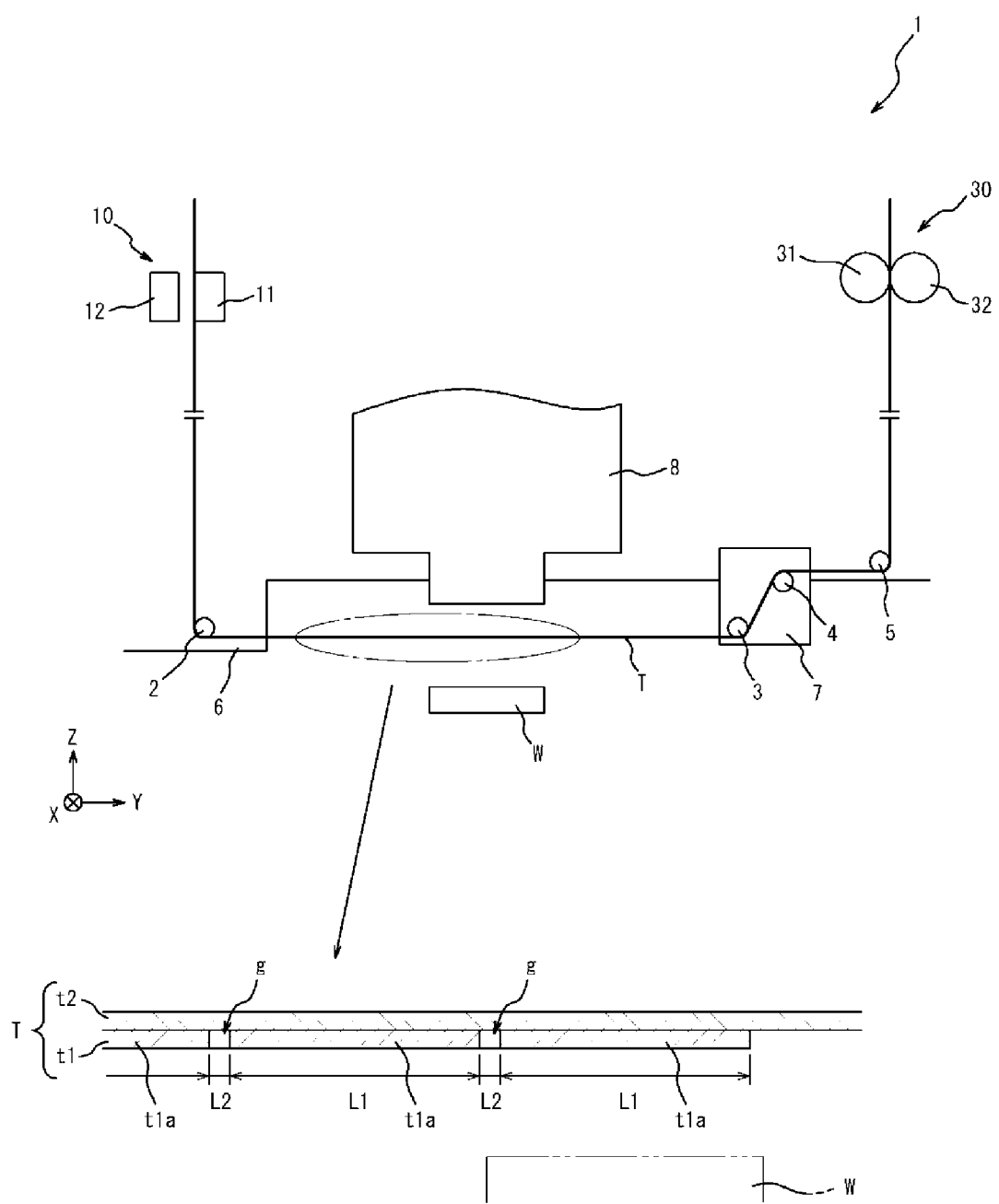

[FIG. 2]
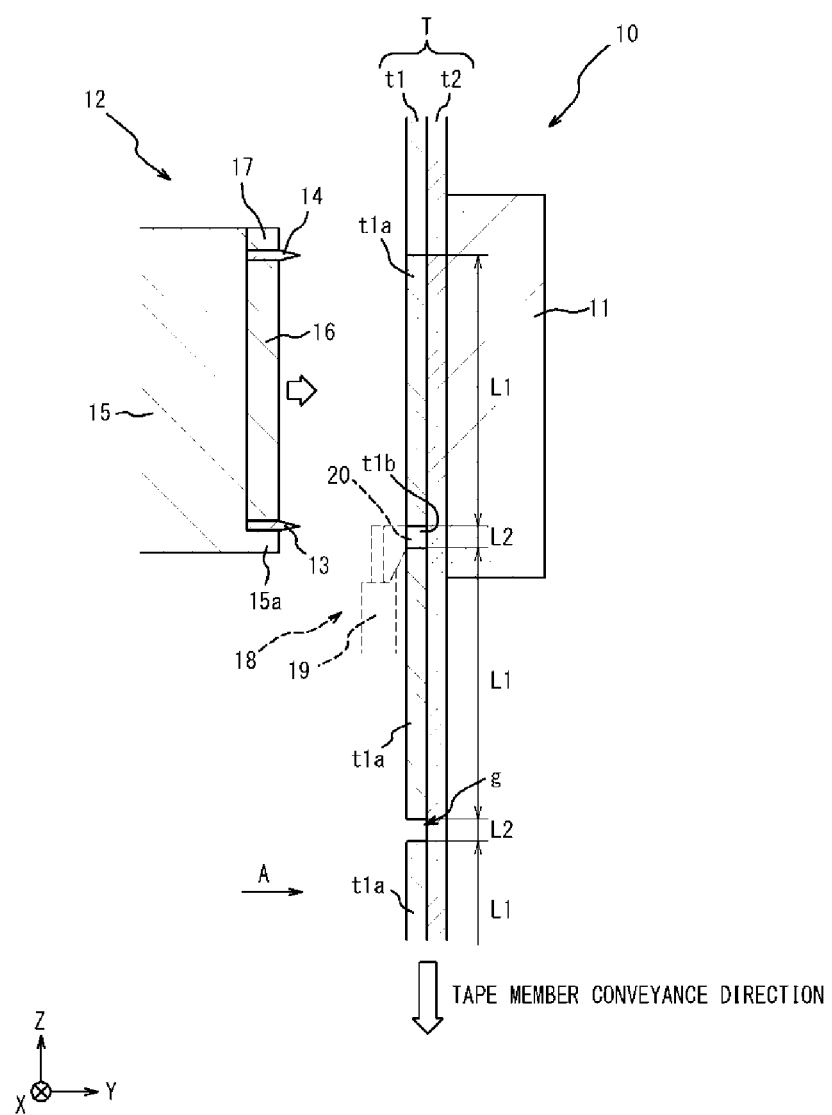

[FIG. 3]
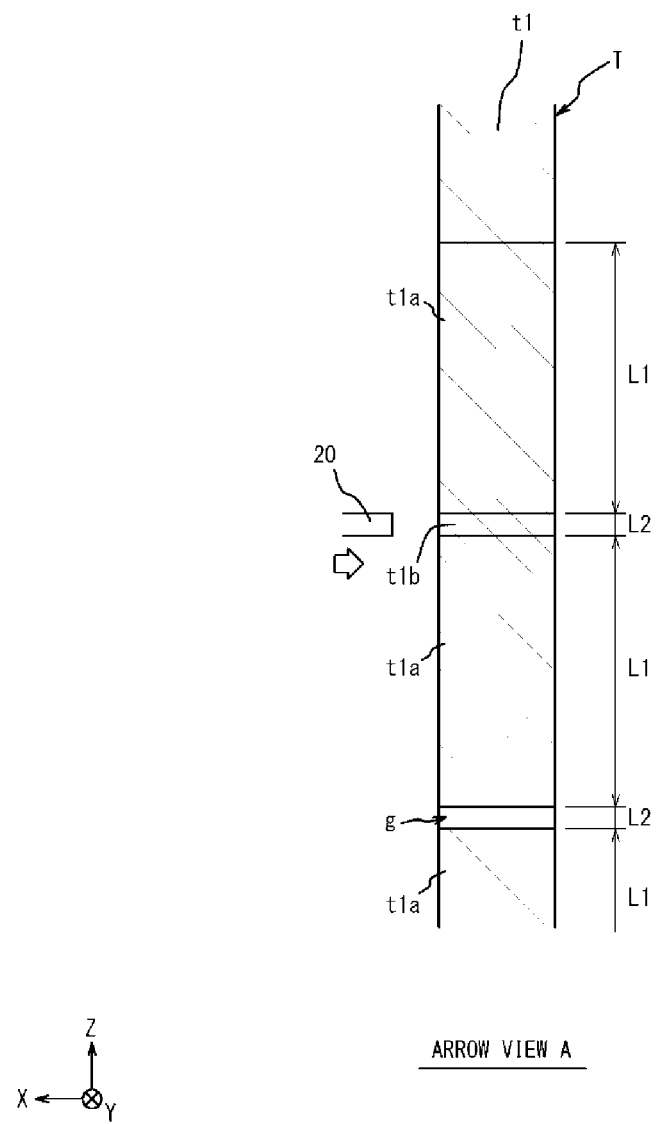
ARROW VIEW A

[FIG. 4]
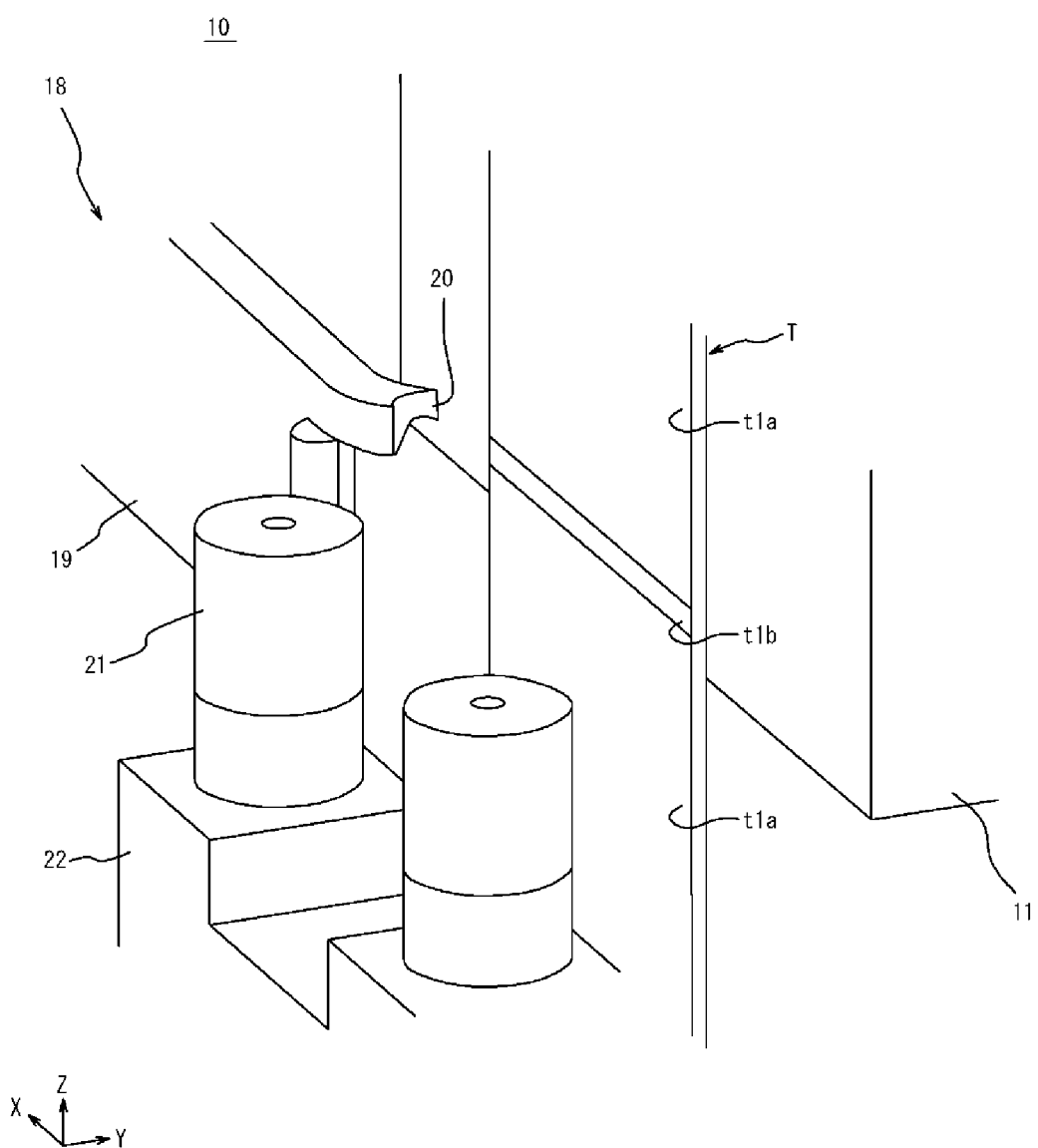

[FIG. 5]
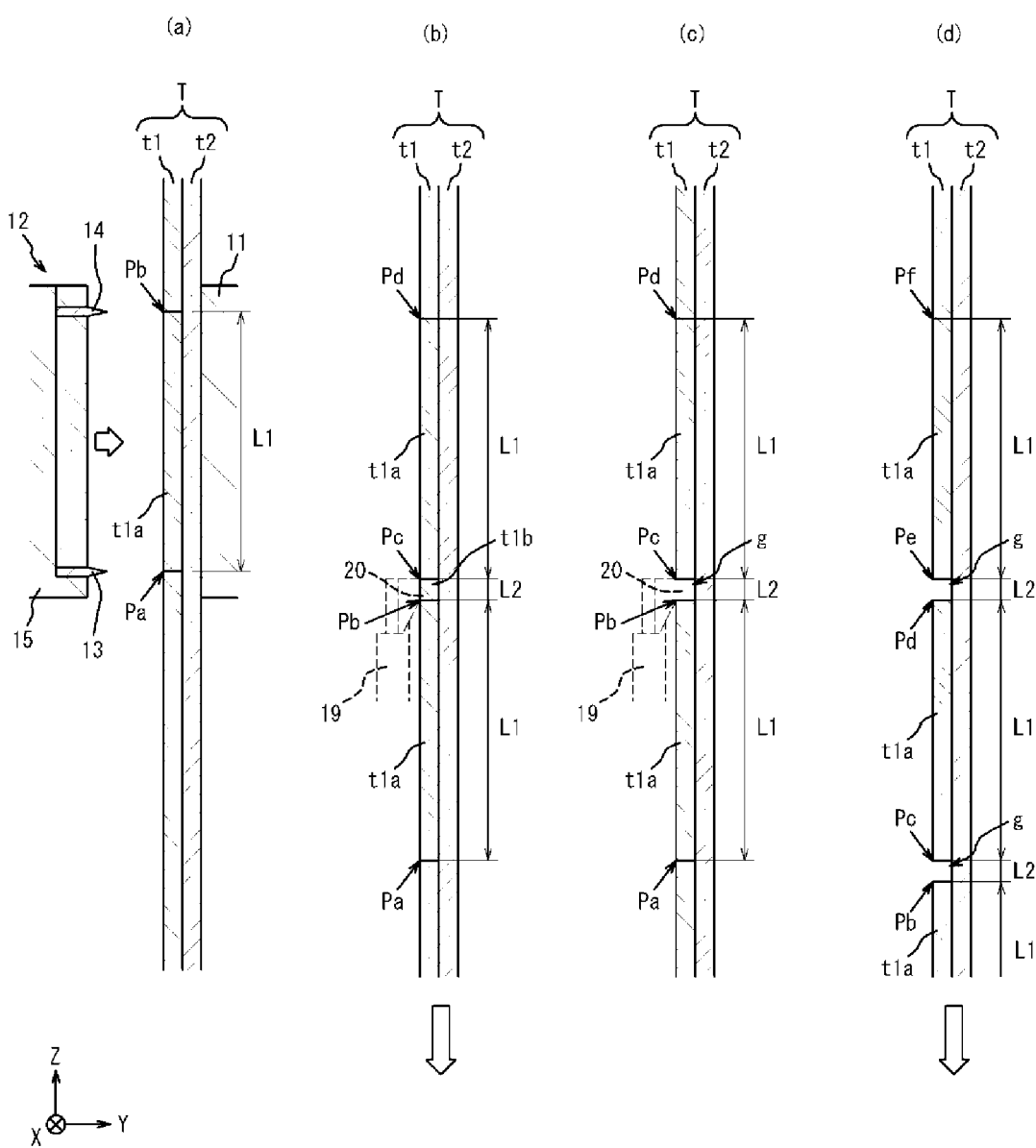

TAPE ADHERING APPARATUS

TECHNICAL FIELD

The present invention relates to a tape adhering apparatus for adhering an anisotropic conductive tape to a workpiece (a substrate or the like on which an electronic component is mounted).

BACKGROUND ART

For mounting an electronic component on a workpiece such as a substrate, for example, a tape adhering apparatus is used in which an anisotropic conductive tape (ACF tape) containing conductive particles and a thermosetting resin adheres to the workpiece.

A tape adhering apparatus disclosed in Patent Literature 1 below uses a tape member in which an anisotropic conductive tape and a separator are laminated, and only the anisotropic conductive tape in a state of being laminated on the separator is cut to a predetermined length and adheres to a workpiece. More specifically, the tape adhering apparatus includes a cutter that cuts only the anisotropic conductive tape, a chuck that can move by a predetermined distance while sandwiching the tape member, and a pressurizing tool that pressurizes the tape member toward the workpiece. After the anisotropic conductive tape is cut with a cutter, the chuck sandwiching the tape member is moved by a predetermined distance to convey the tape member, and the anisotropic conductive tape is cut with the cutter to make only the anisotropic conductive tape to have a predetermined length, and then the tape member is pressurized with a pressurizing tool to attach the anisotropic conductive tape having a predetermined length to the workpiece.

CITATION LIST

Patent Literature

Patent Literature 1: JP4825654B

SUMMARY OF INVENTION

Technical Problem

The conventional tape adhering apparatus as described above is configured to obtain an anisotropic conductive tape having a predetermined length by moving the tape member with respect to the cutter. On the other hand, when the tape member is moved, it is difficult to move the tape member with high accuracy due to the influence of friction with the member in contact with the tape member, fluctuation in tension applied to the tape member, and the like, and an error of about 0.05 to 0.1 mm generally occurs. Therefore, the length of the anisotropic conductive tape attached to the workpiece varies at least in accordance with this error.

An object of the present invention is to solve such a problem, and it is an object of the present invention to provide a tape adhering apparatus capable of uniformizing the length of an anisotropic conductive tape to adhere to a workpiece.

Solution to Problem

A tape adhering apparatus according to the present invention includes: a conveying unit configured to supply a tape member formed by laminating an anisotropic conductive tape and a separator to a workpiece; and a cutting unit configured to cut only the anisotropic conductive tape from the tape member, and adheres the anisotropic conductive tape of a predetermined length to the workpiece, in which the conveying unit intermittently performs an operation of conveying the tape member by a length obtained by adding a gap length to the predetermined length, and the cutting unit includes a blade holding unit that includes a downstream cutting blade and an upstream cutting blade facing the anisotropic conductive tape, holds the downstream cutting blade and the upstream cutting blade in a state where a length from the downstream cutting blade to the upstream cutting blade in a direction in which the tape member extends is the predetermined length, and advances toward the anisotropic conductive tape and cuts the anisotropic conductive tape into the predetermined length when the conveying unit stops the operation of conveying the tape member.

In such a tape adhering apparatus, the blade holding unit preferably includes: a holding and moving unit that advances toward the anisotropic conductive tape; a spacer that is detachably held with respect to the holding and moving unit and sandwiches one of the downstream cutting blade and the upstream cutting blade with the holding and moving unit; and a fixing unit that is detachably held with respect to the spacer and sandwiches one of the downstream cutting blade and the upstream cutting blade with the spacer.

The cutting unit preferably includes a tape removing unit that is located between two anisotropic conductive tapes cut into the predetermined length and removes a removal scheduled portion that becomes the length of the gap length in the anisotropic conductive tape, in which the tape removing unit is configured to remove the removal scheduled portion in a state where the blade holding unit advances toward the anisotropic conductive tape and the downstream cutting blade and the upstream cutting blade cut the anisotropic conductive tape.

The tape removing unit preferably includes a removal moving unit that moves in the width direction of the tape member, and an adjustment roller that enables contact with the removal moving unit, in which the removal moving unit includes a sharp portion that is located in the vicinity of the downstream side of the downstream cutting blade and removes the removal scheduled portion when the removal moving unit moves toward the tape member, and the adjustment roller enables the sharp portion to bring close to the removal scheduled portion when the removal moving unit comes into contact with the adjustment roller, and rotates when the removal moving unit moves in the width direction of the tape member while coming into contact with the adjustment roller.

Advantageous Effects of Invention

When making an anisotropic conductive tape having a predetermined length adhere to a workpiece, the tape adhering apparatus according to the present invention intermittently performs an operation of conveying a tape member by a length obtained by adding a gap length to the predetermined length by the conveying unit as described above. Further, the cutting unit includes a downstream cutting blade and an upstream cutting blade, and these cutting blades are held in a state where a length from the downstream cutting blade to the upstream cutting blade becomes a predetermined length, and cut the anisotropic conductive tape when the conveying unit stops the operation of conveying the tape member. Therefore, according to the tape adhering apparatus of the present invention, the anisotropic conductive tape can be cut such that the portion having the predetermined length cut by the downstream cutting blade and the upstream cutting blade and the portion having the gap length located between the two portions having the predetermined length are alternately arranged. That is, the portion having the predetermined length always has a uniform length by the downstream cutting blade and the upstream cutting blade. In addition, even if an error occurs when the tape member is conveyed by the conveying unit, the error only affects the length of the portion having the gap length, but does not affect the length of the portion having the predetermined length.

BRIEF DESCRIPTION OF DRAWINGS

FIG. 1 is a front view schematically illustrating one embodiment of a tape adhering apparatus according to the present invention.

FIG. 2 is a partially enlarged view of the periphery of a cutting unit illustrated in FIG. 1.

FIG. 3 is an arrow view taken along arrow A illustrated in FIG. 2.

FIG. 4 is a perspective view of a tape removing unit illustrated in FIG. 1.

FIG. 5 is an explanatory view related to an operation when an anisotropic conductive tape is cut.

DESCRIPTION OF EMBODIMENTS

Hereinafter, one embodiment of a tape adhering apparatus (tape adhering apparatus 1) according to the present invention will be described with reference to the drawings. In the following description, the X direction, the Y direction, and the Z direction correspond to the directions of the arrows X, Y, and Z illustrated in the drawings, and the X direction is described as the front-back direction, the Y direction is described as the left-right direction, and the Z direction is described as the up-down direction. However, such directions are merely examples, and are not intended to limit the direction of the tape adhering apparatus in the present invention.

FIG. 1 is a front view schematically illustrating a tape adhering apparatus 1. The tape adhering apparatus 1 of the present embodiment has a function of supplying a tape member T in which an anisotropic conductive tape t1 and a separator t2 are laminated to a workpiece W, cutting only the anisotropic conductive tape t1 into a predetermined length without completely cutting the separator t2, further adhering the anisotropic conductive tape t1 having a predetermined length L1 (hereinafter, the anisotropic conductive tape t1 having the predetermined length L1 is referred to as a "adhering portion t1a") to the workpiece W, and peeling the separator t2 from the adhering portion t1a adhered to the workpiece W to collect the separator t2. The tape adhering apparatus 1 also has a function of cutting the anisotropic conductive tape t1 such that a gap g is located between the two adhering portions t1a as illustrated in FIG. 1. Here, the length of the gap g is referred to as a "gap length L2". The gap length L2 is set to be shorter than the predetermined length L1. The gap g of the present embodiment is, for example, 1 mm or more.

First, the workpiece W will be described. The workpiece W is, for example, a substrate on which an electronic component is mounted, and various substrates such as glass epoxy, ceramic, glass, and FPC can be used. The tape adhering apparatus 1 of the present embodiment includes a stage (not illustrated) that supports the workpiece W in a horizontal state.

The tape member T is formed by laminating the elongated anisotropic conductive tape t1 and the elongated separator t2. The tape member T is wound in a roll shape. The tape adhering apparatus 1 of the present embodiment includes an unwinding reel (not illustrated) for setting the roll-shaped tape member T. The tape member T supplied from the unwinding reel is supported by a first guide portion 2, a second guide portion 3, a third guide portion 4, and a fourth guide portion 5 while passing through tension applying means (for example, means using a dancing roller) (not illustrated) or the like for keeping the tension of the tape member T constant. On the downstream side of the fourth guide portion 5, collecting means (not illustrated) for collecting the tape member T including only the separator t2 is provided. As illustrated in the drawing, the tape member T is supported by the first guide portion 2 and the like in a direction in which the anisotropic conductive tape t1 faces the workpiece W and the separator t2 is in contact with the first guide portion 2 and the second guide portion 3 (in other words, in a direction in which the anisotropic conductive tape t1 is on the lower side and the separator t2 is on the upper side where the workpiece W is located). As illustrated in the drawing, a cutting unit 10 is provided on the upstream side of the first guide portion 2, and a conveying unit 30 is provided on the downstream side of the fourth guide portion 5.

The first guide portion 2, the second guide portion 3, the third guide portion 4, and the fourth guide portion 5 of the present embodiment are all circular pins. In addition to the first guide portion 2 and the fourth guide portion 5, the unwinding reel, the tension applying means, the collecting means (not illustrated), and the cutting unit 10 and the conveying unit 30 are provided in a base 6. The second guide portion 3 and the third guide portion 4 are provided on a movable block 7.

The base 6 is configured to move in the up-down direction. Various drive sources such as a motor, an air cylinder, and the like can be adopted as the drive source that moves the base 6 in the up-down direction. The tape adhering apparatus 1 includes a control unit (not illustrated) (for example, realized by a programmable logic controller (PLC)), and the operation of each unit in the tape adhering apparatus 1 including the drive source of the base 6 is controlled by the control unit. The movable block 7 is movable in the left-right direction with respect to the base 6, but is attached in a way that it cannot be moved in any other direction. That is, when the base 6 moves in the up-down direction with respect to the workpiece W, the movable block 7 also moves in the up-down direction. As a drive source for moving the movable block 7 in the left-right direction, various drive sources such as a motor and an air cylinder can be employed.

The path of the tape member T illustrated in FIG. 1 is merely an example, and the path of the tape member T in the tape adhering apparatus 1 can be variously changed. The conveying unit 30 is provided on the downstream side in the conveyance direction of the tape member T with respect to the workpiece W, but may be provided on the upstream side.

The tape adhering apparatus 1 further includes a head unit 8 above the workpiece W. The head unit 8 can move in the up-down direction separately from the base 6. Furthermore, the head unit 8 can press the tip thereof against the counterpart with a predetermined thrust. Furthermore, the head unit 8 is provided with heating means (not illustrated), and can heat the counterpart when the tip of the head unit 8 is pressed against the counterpart.

Next, the above-described cutting unit 10 will be described. The cutting unit 10 of the present embodiment includes a support unit 11. As illustrated in FIG. 2, in the present embodiment, the support unit 11 is provided on the side where the separator t2 is located with respect to the tape member T extending in the up-down direction along the XZ plane above the first guide portion 2. The surface of the support unit 11 facing the separator t2 extends in the same direction as the direction in which the tape member T supported by the first guide portion 2 or the like extends.

Further, the cutting unit 10 includes a blade holding unit 12. The blade holding unit 12 is provided on the side where the anisotropic conductive tape t1 is located with respect to the tape member T. As illustrated in FIG. 2, the blade holding unit 12 includes two cutting blades (in FIG. 2, a downstream cutting blade 13 positioned on the lower side (the downstream side in the conveyance direction of the tape member T), and an upstream cutting blade 14 located on the upstream side with respect to the downstream cutting blade 13). The blade holding unit 12 further includes a holding and moving unit 15, a spacer 16, and a fixing unit 17.

The downstream cutting blade 13 and the upstream cutting blade 14 have a tip with thin plate shape in the present embodiment, and the downstream cutting blade 13 and the upstream cutting blade 14 have the same shape.

The holding and moving unit 15 has a block shape as a whole, and has a protrusion 15a protruding in the Y direction at the lower portion. The holding and moving unit 15 moves forward and backward toward the support unit 11. In the present embodiment, the holding and moving unit 15 is moved by a motor, an air cylinder, or the like (not illustrated).

The spacer 16 has a plate shape in the present embodiment, and includes a through hole (not illustrated) that extends in the up-down direction and through which a bolt is inserted. The fixing unit 17 has a plate shape having a height lower than that of the spacer 16 in the present embodiment, and includes a through hole (not illustrated) which extends in the up-down direction and through which a bolt is inserted. The protrusion 15a has a screw hole at a position corresponding to the through hole of the spacer 16, and the spacer 16 has a screw hole at a position corresponding to the through hole of the fixing unit 17.

The downstream cutting blade 13 is disposed between the protrusion 15a and the spacer 16 in a direction in which a sharp cutting edge faces the anisotropic conductive tape t1, and is sandwiched between the protrusion 15a and the spacer 16 by further screwing a bolt inserted through the through hole of the spacer 16 into the screw hole of the protrusion 15a. Further, the upstream cutting blade 14 is disposed between the spacer 16 and the fixing unit 17 in a direction in which the sharp cutting edge face the anisotropic conductive tape t1, and is sandwiched between the spacer 16 and the fixing unit 17 by further screwing a bolt inserted through a through hole of the fixing unit 17 into the screw hole of the spacer 16. Note that the length in the Y direction in which the downstream cutting blade 13 and the upstream cutting blade 14 protrude from the spacer 16 is adjusted such that only the anisotropic conductive tape t1 is cut without completely cutting the separator t2 when the holding and moving unit 15 advances toward the support unit 11.

Here, the length from the cutting edge of the downstream cutting blade 13 to the cutting edge of the upstream cutting blade 14 is matched with the predetermined length L1 of the anisotropic conductive tape t1 adhered to the workpiece W described above, and the length of the spacer 16 in the up-down direction is set to satisfy this condition while considering the thicknesses of the downstream cutting blade 13 and the upstream cutting blade 14.

When the downstream cutting blade 13 and the upstream cutting blade 14 are held by the holding and moving unit 15, for example, two grooves may be provided in the holding and moving unit 15, and another means such as fitting the downstream cutting blade 13 and the upstream cutting blade 14 to the grooves may be used without using the spacer 16 and the fixing unit 17 as described above. When the spacer 16 and the fixing unit 17 are used, even when the predetermined length L1 of the anisotropic conductive tape t1 is changed, the spacer 16 may be replaced with a spacer having a different length in the up-down direction, which is excellent in workability.

The cutting unit 10 includes a tape removing unit 18 as illustrated in FIG. 4. The tape removing unit 18 includes a removal moving unit 19. The removal moving unit 19 is provided on the side where the anisotropic conductive tape t1 is located with respect to the tape member T, and can move in the width direction (X direction) of the tape member T by a motor, an air cylinder, or the like (not illustrated). In addition, the removal moving unit 19 of the present embodiment extends along the XZ plane and has a plate shape, and an upper portion thereof protrudes so as to be tapered in the Y direction. Here, a portion protruding in a tapered manner in the removal moving unit 19 is referred to as a sharp portion 20. As illustrated in FIGS. 2 and 3, the sharp portion 20 is located near the downstream side of the downstream cutting blade 13 (below the downstream cutting blade 13).

As illustrated in FIG. 4, the tape removing unit 18 further includes an adjustment roller 21. In the present embodiment, the two adjustment rollers 21 are provided on the side opposite to the side where the tape member T is located with respect to the removal moving unit 19, and are attached to a roller holding unit 22 at intervals in the width direction (X direction) of the tape member T. When the removal moving unit 19 moves in the width direction of the tape member T, the adjustment roller 21 in the present embodiment is attached to the roller holding unit 22 so as to come into contact with the removal moving unit 19, whereby the sharp portion 20 can be brought close to the anisotropic conductive tape t1. The attachment position of the adjustment roller 21 with respect to the roller holding unit 22 can be changed in the X direction and the Y direction, and the timing at which the sharp portion 20 approaches the anisotropic conductive tape t1 or the distance between the sharp portion 20 and the anisotropic conductive tape t1 can be adjusted. The adjustment roller 21 of the present embodiment is adjusted such that when the removal moving unit 19 moves in the width direction of the tape member T, the sharp portion 20 illustrated in FIG. 4 comes into contact with the removal scheduled portion t1b to be described later and scrapes the removal scheduled portion t1b so that the removal scheduled portion t1b can be removed over the entire width direction of the tape member T. Here, when the removal moving unit 19 moves in the width direction of the tape member T and comes into contact with the adjustment roller 21, since the adjustment roller 21 is rotated by the removal moving unit 19, generation of a strong frictional force therebetween can be prevented.

The tape removing unit 18 includes removal scheduled portion collecting means (not illustrated). The removal scheduled portion collecting means is, for example, suction means provided in the vicinity of the removal scheduled portion t1b, and has a function of sucking and collecting the portion-to-be-removed t1b when the removal moving unit 19 moves in the tape width direction and the sharp portion 20 removes the removal scheduled portion t1b.

As illustrated in FIG. 1, in the present embodiment, the above-described conveying unit 30 includes a driving roller 31 rotated by a motor (not illustrated) and a driven roller 32 that rotates together with the driving roller 31 with the tape member T sandwiched between the driving roller 31 and the driven roller. The motor that rotates the driving roller 31 operates in accordance with the command from the control unit described above, and thus can convey the tape member T.

Next, the operation of the tape adhering apparatus 1 will be described. In the following description, it is assumed that the tape member T is supported by the first guide portion 2 and the like as illustrated in FIG. 1. Further, the support unit 11 and the blade holding unit 12 illustrated in FIG. 5(a) are omitted in FIGS. 5(b) to 5(d).

First, the blade holding unit 12 advances toward the support unit 11 and further retreats as illustrated in FIG. 5(a) by the command from the control unit described above. As a result, as illustrated in the drawing, the anisotropic conductive tape t1 located in front of the blade holding unit 12 is cut at a position Pa by the downstream cutting blade 13 and cut at a position Pb by the upstream cutting blade 14. Here, a length from the downstream cutting blade 13 to the upstream cutting blade 14 is set to a predetermined length L1. That is, the anisotropic conductive tape t1 is reliably cut with a length of the predetermined length L1 by the downstream cutting blade 13 and the upstream cutting blade 14 without variation in length, thereby forming the adhering portion t1a. The conveyance of the tape member T by the conveying unit 30 is stopped until the blade holding unit 12 advances and retreats.

Next, the driving roller 31 and the driven roller 32 of the conveying unit 30 illustrated in FIG. 1 are rotated by a command from the control unit, and the tape member T is conveyed by a length obtained by adding the gap length L2 to the predetermined length L1 from the state of FIG. 5(a) as illustrated in FIG. 5(b). Then, when the blade holding unit 12 advances toward the support unit 11 and further retreats, the anisotropic conductive tape t1 is cut at a position Pc by the downstream cutting blade 13 and cut at a position Pd by the upstream cutting blade 14 as illustrated in the drawing, so that the next adhering portion t1a is formed between the position Pc and the position Pd. A portion of the anisotropic conductive tape t1 located between the position Pb and the position Pc is referred to as a removal scheduled portion t1b. The removal scheduled portion t1b is located where the sharp portion 20 of the removal moving unit 19 is provided in the up-down direction.

Thereafter, the removal moving unit 19 is moved in the width direction of the tape member T by a command from the control unit. As a result, since the sharp portion 20 illustrated in FIG. 4 removes the removal scheduled portion t1b by scraping, as illustrated in FIG. 5(c), a gap g can be provided between the position Pb and the position Pc in the anisotropic conductive tape t1. While the removal moving unit 19 is moving in the width direction of the tape member T, the conveyance of the tape member T by the conveying unit 30 is stopped.

In providing the gap g between the position Pb and the position Pc by the sharp portion 20, when the anisotropic conductive tape t1 is cut at the position Pc and the position Pd as illustrated in FIG. 5(b), the blade holding unit 12 is preferably stopped in a state of being advanced toward the support unit 11. That is, since the downstream cutting blade 13 and the upstream cutting blade 14 are in the state of being cut into the anisotropic conductive tape t1, when the removal moving unit 19 moves and the sharp portion 20 removes the removal scheduled portion t1b, the contact between the adhering portion t1a located between the downstream cutting blade 13 and the upstream cutting blade 14 and the sharp portion 20 can be avoided by the downstream cutting blade 13. As a result, it is possible to prevent problems such as twisting of the end portion of the adhering portion t1a by the moving sharp portion 20. In addition, by pressing the anisotropic conductive tape t1 with the downstream cutting blade 13 and the upstream cutting blade 14, it is possible to prevent a positional fluctuation of the anisotropic conductive tape t1 due to vibration or impact when the sharp portion 20 operates. The blade holding unit 12 stopped in the advanced state retreats after providing the gap g between the position Pb and the position Pc by the sharp portion 20.

Thereafter, the driving roller 31 and the driven roller 32 of the conveying unit 30 illustrated in FIG. 1 are rotated by a command from the control unit, and the tape member T is conveyed by a length obtained by adding the gap length L2 to the predetermined length L1 from the state of FIG. 5(c) as illustrated in FIG. 5(d). Then, by advancing the blade holding unit 12 toward the support unit 11 and retreating the blade holding unit again, the anisotropic conductive tape t1 is cut at a position Pe by the downstream cutting blade 13 and cut at a position Pf by the upstream cutting blade 14. Thereafter, by moving the removal moving unit 19 again in the width direction of the tape member T, the gap g can be provided between the position Pd and the position Pe in the anisotropic conductive tape t1.

In this manner, the tape member T is intermittently conveyed by the conveying unit 30 by a length obtained by adding the gap length L2 to the predetermined length L1, and the blade holding unit 12 and the removal moving unit 19 are operated as described above, whereby the tape member T on which the adhering portions t1a having the predetermined length L1 is laminated can be supplied to the workpiece W with the gap g between the adjacent adhering portions t1a as illustrated in FIG. 1. Note that even if an error occurs when the tape member T is conveyed by the conveying unit 30, the error only affects the gap length L2, which is the length of the gap g, and the length of the adhering portion t1a remains the same as the predetermined length L1.

Thereafter, the base 6 is moved downward to bring the tape member T close to the workpiece W. Then, the head unit 8 is moved downward, and the heating means included in the head unit 8 is operated to press the tape member T while heating the tape member at the tip of the head unit 8. As a result, the adhering portion t1a having a length of the predetermined length L1 can adhere to the workpiece W. The heat generated when the head unit 8 heats and presses the tape member T extends not only to the portion with which the head unit 8 is in contact but also to the periphery thereof. That is, when the adhering portion t1a to be adhered to the workpiece W next is too close to the head unit 8, the adhering portion t1a to be adhered to the workpiece W next may be softened by heat from the head unit 8. Here, when the adjacent adhering portions t1a are arranged without a gap, the head unit 8 cannot press up to the end of the adhering portion t1a to be adhered to the workpiece W in order to prevent the adhering portion t1a to be adhered to the workpiece W next from being affected. When the adjacent adhering portions t1a are arranged without a gap in this manner, in general, a range of 0.3 to 0.5 mm from the end of the adhering portion t1a to be adhered to the workpiece W needs to be secured as a range that cannot be pressed by the head unit 8 (stepping margin). However, in such a portion that cannot be pressed by the head unit 8, the adhering portion t1*a* may float from the workpiece W or may bite air bubbles. On the other hand, in the present embodiment, since the gap g (1 mm or more as an example) is provided between the adjacent adhering portions t1*a*, even if the end of the head unit 8 is located immediately above the end of the adhering portion t1*a* to be adhered to the workpiece W (furthermore, even if the end of the head unit 8 slightly protrudes up to the gap g), the adhering portion t1*a* to be adhered to the workpiece W next is not affected. Therefore, according to the tape adhering apparatus 1 of the present embodiment, it is possible to prevent the above-described adhering portion t1*a* from floating from the workpiece W and from biting bubbles. Then, after the tape member T is pressed for a predetermined time, the head unit 8 is raised to above the height illustrated in FIG. 1 (as will be described later, since the movable block 7 moves to the left side, to a height that does not hinder the movement of the movable block 7).

Thereafter, by moving the movable block 7 to the left side from the state illustrated in FIG. 1, the separator t2 can be peeled off from the anisotropic conductive tape t1 adhered to the workpiece W.

After moving the movable block 7 to the left side, the base 6 is raised, and the movable block 7 is moved to the right side to its original position. Thereafter, the workpiece W to which the anisotropic conductive tape t1 is adhered is moved, a new workpiece W is moved to a position illustrated in FIG. 1, and the tape member T is conveyed such that the next anisotropic conductive tape t1 is located above the new workpiece W. Thereafter, by performing the above-described operation, the next anisotropic conductive tape t1 can be adhered to the new workpiece W, and the separator t2 can be peeled off from the anisotropic conductive tape t1.

Although one embodiment of the present invention has been described above, the present invention is not limited to the specific embodiment, and various modifications and changes can be made within the scope of the gist of the present invention described in the claims unless otherwise limited in the above description. For example, the configuration of the above-described embodiment can be appropriately added or deleted, and the configuration of one embodiment can be provided in another embodiment. In addition, the effects of the above embodiment are merely examples of the effects caused by the present invention, and do not mean that the effects of the present invention are limited to the above effects.

For example, the tape adhering apparatus 1 may be provided with a camera that images the adhering portion t1*a* and a camera that images the workpiece W, and a control unit (not illustrated) may have a function of recognizing the positions of the adhering portion t1*a* and the workpiece W from image data obtained from the cameras and a function of moving a stage that supports the workpiece W on the basis of the positions. As described above, in the present embodiment, since the gap g is formed between the adjacent adhering portions t1*a*, the position of the adhering portion t1*a* can be accurately recognized. Then, immediately before adhering, the adhering portion t1*a* and the workpiece W are imaged to recognize the position of the adhering portion t1*a* and the position of the workpiece W placed on the stage, and then the stage is moved so that the position where the adhering portion t1*a* of the workpiece W placed on the stage is adhered coincides with the current position of the adhering portion t1*a*. As a result, the adhering portion t1*a* accurately cut to the predetermined length L1 can be accurately adhered to the position where the adhering portion t1*a* of the workpiece W is adhered without being affected by an error when the tape member T is conveyed.

REFERENCE SIGNS LIST 1 tape adhering apparatus
10 cutting unit
12 blade holding unit
13 downstream cutting blade
14 upstream cutting blade
15 holding and moving unit
16 spacer
17 fixing unit
18 tape removing unit
19 removal moving unit
20 sharp portion
21 adjustment roller
30 conveying unit
L1 predetermined length
L2 gap length
T tape member
M workpiece
g gap
t1 anisotropic conductive tape
t1*b* removal scheduled portion
t2 separator

The invention claimed is:

1. A tape adhering apparatus that includes: a conveying unit configured to supply a tape member formed by laminating an anisotropic conductive tape and a separator; and a cutting unit configured to cut only the anisotropic conductive tape from the tape member, and that adheres the anisotropic conductive tape of a predetermined length to a workpiece, wherein
the conveying unit intermittently performs an operation of conveying the tape member by a length obtained by adding a gap length to the predetermined length, and
the cutting unit includes a blade holding unit that includes a downstream cutting blade and an upstream cutting blade facing the anisotropic conductive tape, holds the downstream cutting blade and the upstream cutting blade in a state where a length from the downstream cutting blade to the upstream cutting blade in a direction in which the tape member extends is the predetermined length, and advances toward the anisotropic conductive tape and cuts the anisotropic conductive tape into the predetermined length when the conveying unit stops the operation of conveying the tape member.

2. The tape adhering apparatus according to claim 1, wherein
the blade holding unit includes:
a holding and moving unit that advances toward the anisotropic conductive tape;
a spacer that is detachably held with respect to the holding and moving unit and sandwiches one of the downstream cutting blade and the upstream cutting blade with the holding and moving unit; and
a fixing unit that is detachably held with respect to the spacer and sandwiches one of the downstream cutting blade and the upstream cutting blade with the spacer.

3. The tape adhering apparatus according to claim 1, wherein
the cutting unit includes a tape removing unit that is located between two anisotropic conductive tapes cut into the predetermined length and removes a removal scheduled portion that becomes the length of the gap length in the anisotropic conductive tape, wherein the tape removing unit is configured to remove the removal scheduled portion in a state where the blade holding unit advances toward the anisotropic conductive tape and the downstream cutting blade and the upstream cutting blade cut the anisotropic conductive tape.

4. The tape adhering apparatus according to claim 3, wherein the tape removing unit includes a removal moving unit that moves in a width direction of the tape member, and an adjustment roller that is configured to come into contact with the removal moving unit, wherein the removal moving unit includes a sharp portion that is located in a vicinity of a downstream side of the downstream cutting blade and removes the removal scheduled portion when the removal moving unit moves toward the tape member, and the adjustment roller enables bringing the sharp portion close to the removal scheduled portion when the removal moving unit comes into contact with the adjustment roller, and rotates when the removal moving unit moves in the width direction of the tape member while coming into contact with the adjustment roller.

* * * * *